(12) United States Patent
Sternfeld et al.

(10) Patent No.: US 10,484,422 B2
(45) Date of Patent: Nov. 19, 2019

(54) PREVENTION OF RENDEZVOUS GENERATION ALGORITHM (RGA) AND DOMAIN GENERATION ALGORITHM (DGA) MALWARE OVER EXISTING INTERNET SERVICES

(71) Applicant: Cybereason Inc., Boston, MA (US)

(72) Inventors: Uri Sternfeld, Gedera (IL); Yonatan Striem-Amit, Gedera (IL)

(73) Assignee: Cybereason, Inc., Boston, MA (US)

( * ) Notice: Subject to any disclaimer, the term of this patent is extended or adjusted under 35 U.S.C. 154(b) by 267 days.

(21) Appl. No.: 15/296,700

(22) Filed: Oct. 18, 2016

(65) Prior Publication Data

US 2017/0195342 A1  Jul. 6, 2017

Related U.S. Application Data

(60) Provisional application No. 62/273,768, filed on Dec. 31, 2015.

(51) Int. Cl.
*H04L 29/06* (2006.01)
*G06F 21/55* (2013.01)
(Continued)

(52) U.S. Cl.
CPC ......... *H04L 63/145* (2013.01); *G06F 16/958* (2019.01); *G06F 21/554* (2013.01);
(Continued)

(58) Field of Classification Search
None
See application file for complete search history.

(56) References Cited

U.S. PATENT DOCUMENTS

2015/0264070 A1* 9/2015 Harlacher ........... H04L 63/1441
726/23
2015/0373039 A1* 12/2015 Wang ................. H04L 63/1425
726/23

(Continued)

OTHER PUBLICATIONS

Antonakakis et al., "From Throw-Away Traffic to Bots: Detecting the Rise of DGA-Based Malware" in 21st USENIX Security Symposium, Aug. 8-10, 2012, Bellevue, WA.

*Primary Examiner* — William J. Goodchild
(74) *Attorney, Agent, or Firm* — Flachsbart & Greenspoon LLC; Robert P. Greenspoon

(57) ABSTRACT

A method, computer program product, system and apparatus for the prevention of RGA and DGA malware over an existing internet service is disclosed. The invention exploits the fact that when malware rapidly attempts to access many contact points, a malware is likely to need several attempts to find a current server. Software is installed on the individual endpoints in a network of internet services. The software monitors the websites or services and collects information about access attempts. The invention detects a series of failed attempts by the malware to access the service/website. These attempts can be accrued by being temporally linked (e.g., many attempts in a short time, many attempts consecutively), conceptually linked (e.g., similar addresses, similar attempts across multiple machines or time scales), higher than normal prevalence or other methods. The invention provides an indication of a malware attempt if enough failed attempts have accrued.

26 Claims, 8 Drawing Sheets

(51) Int. Cl.
*H04L 29/08* (2006.01)
*G06F 16/958* (2019.01)
*H04L 29/12* (2006.01)

(52) U.S. Cl.
CPC ........ *G06F 21/556* (2013.01); *H04L 63/1416* (2013.01); *H04L 63/1425* (2013.01); *H04L 67/02* (2013.01); *H04L 61/1511* (2013.01); *H04L 2463/144* (2013.01)

(56) References Cited

U.S. PATENT DOCUMENTS

2015/0373043 A1* 12/2015 Wang .................... G06F 21/552
706/12
2017/0041333 A1* 2/2017 Mahjoub ............. H04L 61/1511

\* cited by examiner

PREVENTION OF RENDEZVOUS GENERATION ALGORITHM (RGA) AND DOMAIN GENERATION ALGORITHM (DGA) MALWARE OVER EXISTING INTERNET SERVICES

This application claims the benefit of U.S. Provisional Application No. 62/273,768, filed Dec. 31, 2015, the entire disclosure of which is herein incorporated by reference.

TECHNICAL FIELD OF THE INVENTION

The present invention relates to computer security, and more specifically to prevention of malware attacks.

BACKGROUND OF THE INVENTION

There are many types of malware which communicate back to their controller. These communications can consist of receiving commands and updates, exfiltrating data and passing other information in either direction. However, the use of single (or a small number of) pre-defined or hard-coded web-based points of communication (i.e. "rendezvous locations") such as a single domain, email address, twitter account, etc. to which the malware can connect, leaves the malware vulnerable to being disrupted by the loss of control of that rendezvous location. Such loss can occur most frequently when law enforcement or cyber-security organizations take control of some or all of these locations. In addition, the use of a single rendezvous location allows the use of mitigating measurements such as blacklists.

In order to avoid this problem, many malware use a Domain Generation Algorithm (DGA) to generate new domain names each in short time intervals. Most frequently, a DGA is based on a Pseudo Random Number Generator (PRNG) which generates a list of domains using a seed which can be known by both the malware and its operators during this time interval using prior knowledge (most often—the current date). The malware attempts to access domains in some sequence (it is possible to choose from among domains which are generated by the PRNG in a random sequence) until it finds a domain which was registered by the malware's operator. This allows the malware and its operator to establish an ad-hoc communication channel.

There have been attempts (such as Antonakakis et al., "From Throw-Away Traffic to Bots: Detecting the Rise of DGA-Based Malware", 21st USENIX Security Symposium, Aug. 8-10, 2012, Bellevue, Wash., available at https://www.usenix.org/system/files/conference/usenixsecurity12/sec12-final127.pdf (last visited Oct. 12, 2016)) to discover indications of DGA communications from network data. For example, a forensic analysis can show attempts to perform a DNS query in order to communicate with multiple domains which do not exist and receive NXDOMAIN DNS response for those domains. It is also possible to improve accuracy of discovery by adding additional metrics such as a number of NXDOMAINS followed by a successful domain, or filtering domains belonging to known programs (such as file-sharing programs) which tend to have a large number of NXDOMAINS and assigning them different probabilities of being malicious.

Previous such attempts have been based analyzing the network level. As such these attempts can find (and potentially block) DGA at the level of a single endpoint based on network data originating from that endpoint. However, they do not receive information about the specific program/service on the endpoint from which this query originated. This is because the queries themselves do not contain any information about which program originated the request and which part of the code in the program was involved.

In contrast, the solution provided by the present invention installs software on the individual endpoints in the system. The software monitors the actual programs and collects information about where each request originated from. This is done, for example, by using Windows ETW (Event tracing for Windows) which is used for debugging. ETW allows the algorithm to collect information on exactly from what part of which program the request originates. As such, attributions can be made on a much finer grained scale and result in less errors.

While current methods of detecting such DGA can be accurate under certain conditions, they all suffer from the reliance on a stream of DNS queries from multiple programs on the same endpoint, all interlaced together. Thus, an attacker can avoid detection by lowering the frequency of queries in order to drown the NXDOMAIN responses in the noise generated by any active endpoint. In addition, the attacker may choose an existing popular service or website, such as Twitter, which defenders will not block.

In many cases, a sophisticated attacker could utilize the following method to achieve communication with malware:

1. Choose a website(s) or service(s) which allows users to create or modify content. Such services include Twitter (creation of twitter accounts), email services (creation of email accounts), hosting services such as Google Apps https://developers.google.com/google-apps/ (last visited Oct. 12, 2016) (creation of websites), blogging sites (creation of blogs), LinkedIn, shopping sites (creation of shopping carts and wishlists), Wikis, newspapers with comment sections, chat services (user logins), Skype (user name) etc.

2. Create a PRNG which can create instances of the type of content supported by the chosen service. The seed of this PRNG can change each time interval and be known during that interval by both the malware and its operator based on prior knowledge. For example, the current date, the daily trending Twitter hash-tag, the average temperature in Rio de Janeiro or the current USD-to-Yen exchange rate.

3. When communication is desired, the operator can register or create the generated rendezvous location (e.g. by logging into a website, creating a domain etc.) and modify the content on the chosen service(s). Any of the rendezvous locations generated for the current time interval will be enough.

4. After a successful connection the operator can pass commands and updates to the malware.

5. It's also possible for the malware to modify that information, using the point of contact as a bidirectional channel which also allows data exfiltration.

6. The operator can read the content modified by the malware. Note that content can be masked to hide its meaning through steganography or other embedding methods. For example, an IP address can be specified by the number of words in sentences to create a number from a paragraph.

7. The content thus transmitted between the controller and the malware can be direct instructions (such as the IP of a target to be Distributed Denial of Service (DDOS'ed)) or indirect information such as an IP to which the malware can communicate for more instructions or to exfiltrate data.

We define this type of communication as a Rendezvous Generation Algorithm (RGA). Note that this attack circumvents conventional methods of detection. By utilizing existing services/websites an attacker has several advantages:

1. Hard to block popular domains entirely (and blocking only specific communications to them is often impossible, mainly since existing defensive solutions do not provide such mechanisms to their users).
2. The communication will look innocent both to a human observer and an automated statistical model which looks for rare/new/strange domains.
3. Harder for law enforcement agencies to "take over" and control the domain.
4. It may be impossible to predict in advance based on the chosen seed—for example, the exact currency exchange rate in a future date.

However, there are several defenses which can be utilized. On the server side, for example, a website can detect that a given computer/IP is trying to access multiple accounts/pages/services which do not exist and slow down the access of that computer/IP. However, in many cases this will not be enough. Thus there is a need for solutions which can be utilized on the level of the individual endpoint, network or cloud proxy.

SUMMARY OF THE INVENTION

The present invention offers a solution on the defense side, which is to detect when an attempt was made to access a contact point which does not exist. In addition, the operator of the malware must have redundancy in the usage of DGA. Some possible command and control (C&C) will not be used or will be used for very short time periods. Thus, when malware rapidly attempts to access many contact points such as multiple C&C channels, a malware is likely to need several attempts to find a current C&C channel.

Thus, the invention detects a series of failed attempts by the malware to access the service/website. These attempts can be temporally linked (e.g., many attempts in a short time, many attempts consecutively, etc.), conceptually linked (similar addresses, similar attempts across multiple machines or time scales, etc.), higher than normal prevalence or other methods.

However, in order to be able to link these attempts, the invention first detects that an attempt to access a service or website has failed. The simplest method of doing so is to detect indications of non-existence, for example a 404 response for nonexistent web pages. Network-based solutions will often fail for encrypted communication, for example websites which use the HTTPS protocol, and therefore only an endpoint-based solution will be able to detect these indications of non-existence.

This is useful when the algorithm knows what the failure messages look like for a specific website/service. However, in many cases the algorithm will not have such specific knowledge. For these cases the algorithm estimates what a mistake in the protocol will look like. Such a mistake will be what happens when a DGA attempts to access something which does not exist.

DETAILED DESCRIPTION OF INVENTION

Figure 1:
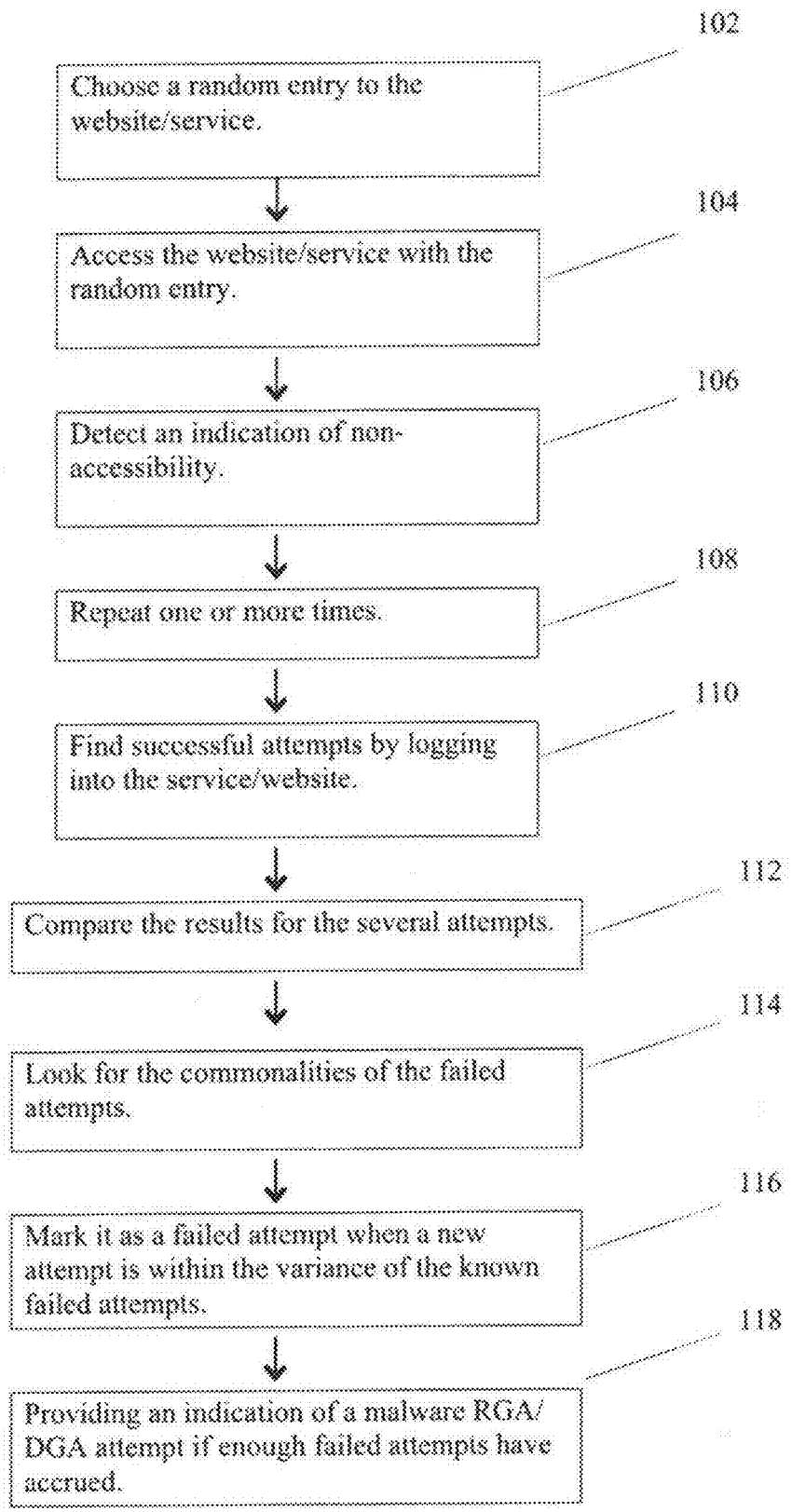
FIG. 1 is a flowchart of steps in a method for prevention of RGA and DGA malware.

FIG. 1 is a flowchart a steps in a method for prevention of RGA and DGA malware:

Step 102: choose a random entry to the website/service. This can be a random twitter account, a random webpage, etc. Random entries can be generated in many ways such as by looking for differences between two existing access attempts to service, taking the common part between the two requests fixed and modifying the different parts. In some cases, one can utilize information about the protocol such as generating a random url on a website.

Step 104: access the website/service with the random entry. This can be done using standard protocols. For instance browsing to the webpage, looking at a Twitter account, searching for a Skype username, emailing an email account to see if it exists, etc. Note that for a randomly chosen parameter the query will fail with high probability.

Step 106: in some case accessing the website/service is hard to do. In these cases one can detect an indication of non-existence for instance by using a replay to take the input and replay it using man in the middle.

Step 108: repeat several times.

Step 110: if possible find successful attempts by logging into the service/website.

Step 112: compare the results for the several attempts. Find the difference between the results using a desired distance function, for example, the earth movers distance. If desired one can remove the random input used from each response.

Step 114: look for the commonalities of the failed attempts. This can be either common elements (which do not appear in successful attempts) or simply distances between the unsuccessful attempts.

Step 116: when a new attempt is within the variance of the known failed attempts, mark it as a failed attempt.

Step 118: when enough failed attempts have accrued (either temporally, logically, accrued over time or other method) indicate that this is an RGA attempt by malware.

The above protocol can be used either when a service is first accessed, when new domains are found, periodically or using other methods. Of course, in some cases, one can discover when an error is created by looking for such key phrases as 'Page not found', 'did you mean'<h1>Sorry, that page doesn't exist!</h1>etc.

Example 1

Figure 2:
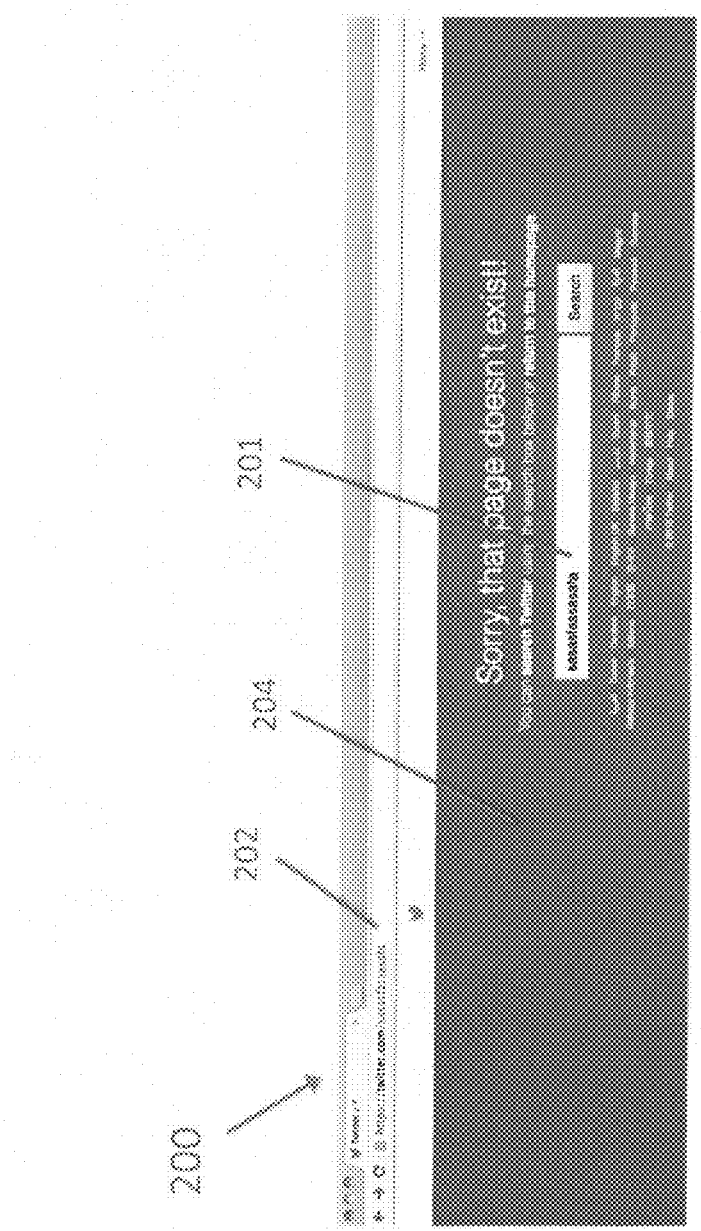
FIG. 2 illustrates the Twitter web service application for a random nonexistent username.
Figure 3:
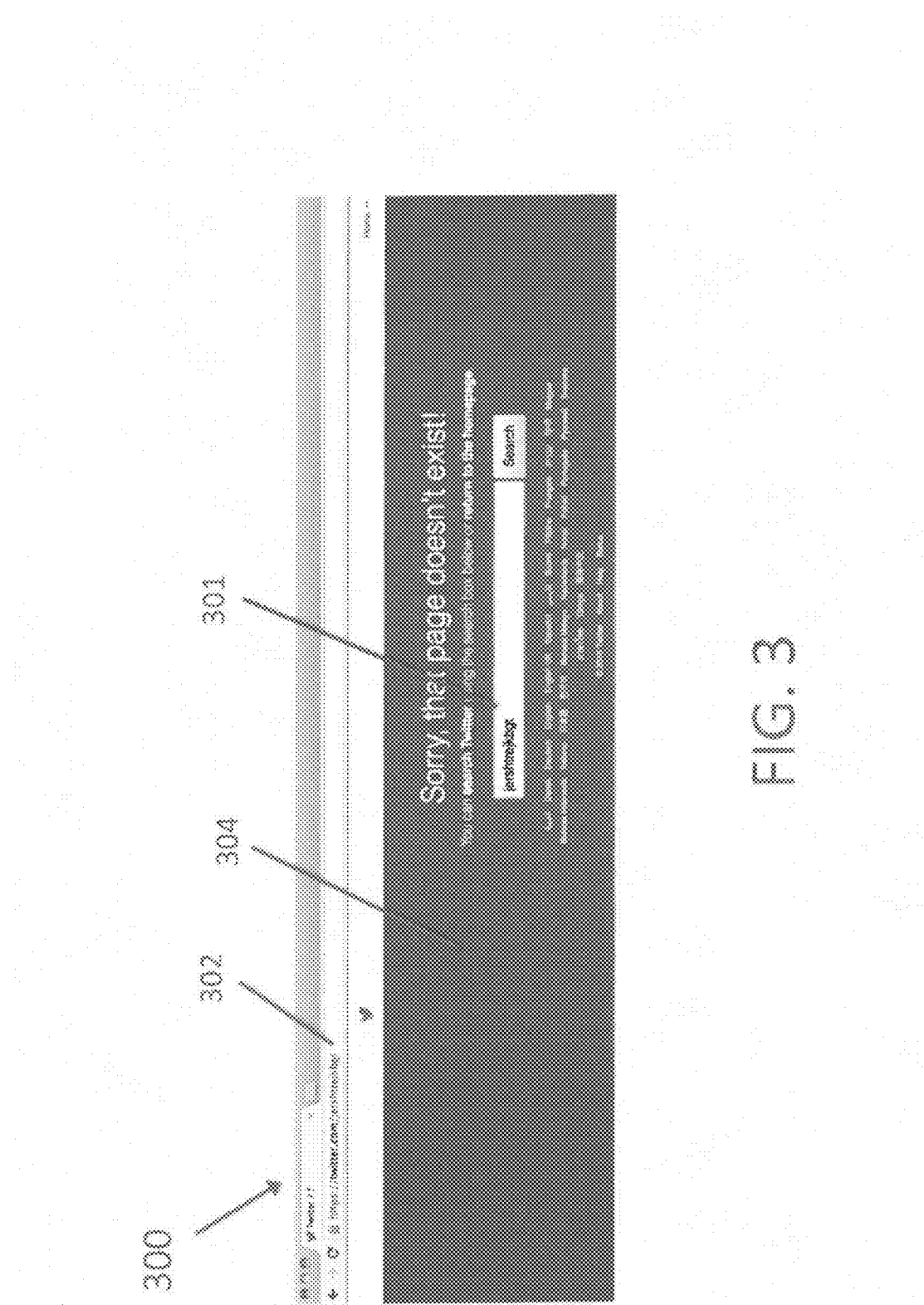
FIG. 3 illustrates the Twitter web service application for another random nonexistent username.
Figure 4:
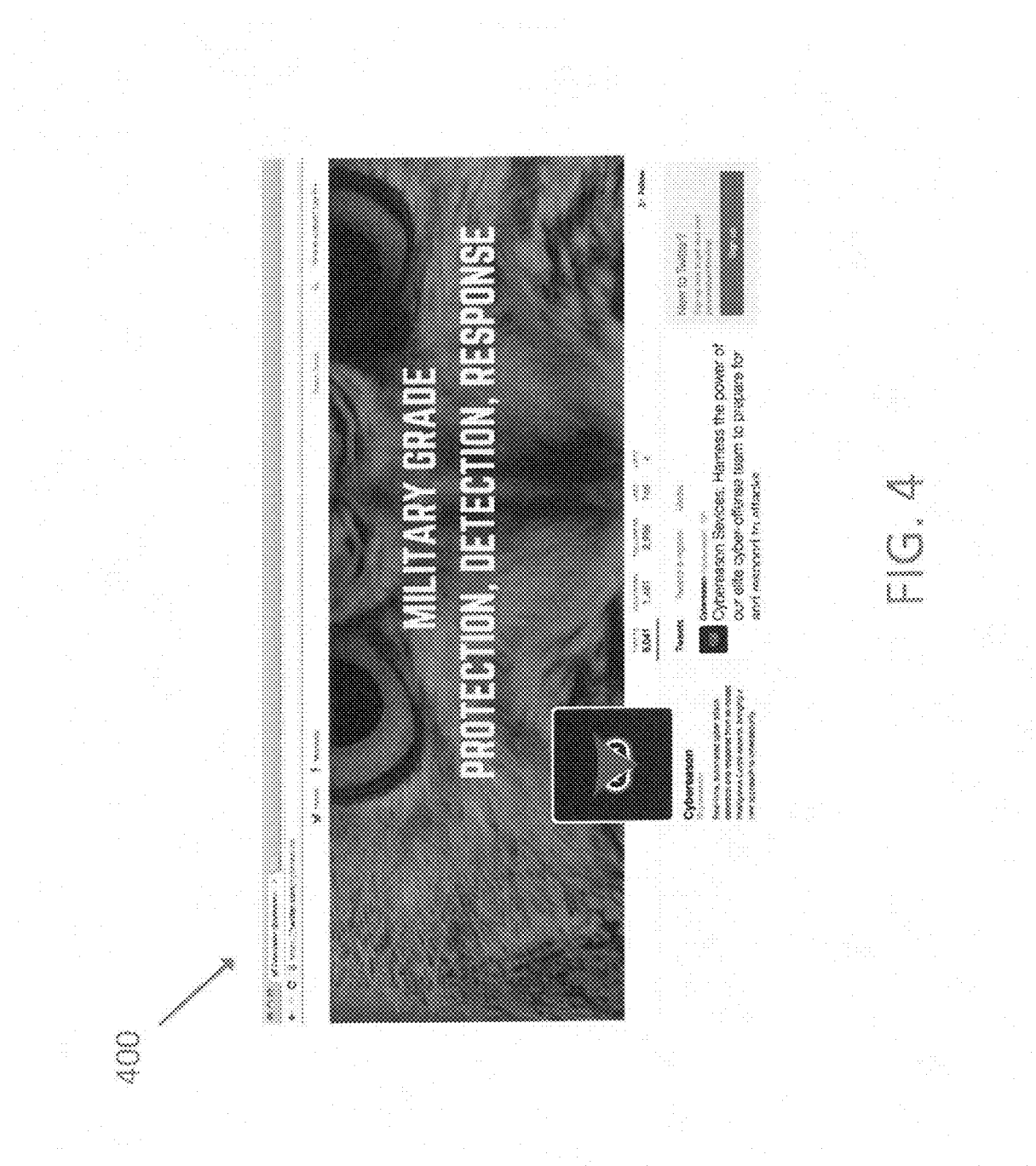
FIG. 4 illustrates the Twitter web service application for a valid username.

FIG. 2 illustrates the Twitter web service application for a random nonexistent username. Choosing a random Twitter name login sasasfassasafa 201 goes to the url https://twitter.com/sasasfassasafa 202. Twitter provides a webpage 204. FIG. 3 illustrates the Twitter web service application for another random nonexistent username. Choosing another random Twitter name login jershtrejkbgt 301 goes to the url https://twitter.com/jershtrejkbgt 302 and finds a similar webpage 304. Note that the two pages look very similar and have similar wording (the earth movers distance is just the difference of the two random Twitter name login strings). However, if one goes to a valid Twitter page (https://twitter.com/cybereason) (FIG. 4) there is something very different.

Note that the difference between Cybereason's Twitter page 400 and the random pages (FIGS. 2 and 3) (using e.g., the Earth movers distance) is very large. Thus, one can detect the instance in which a valid result is returned as compared to the result of a random query. Of course, one does not have to choose distances based solely on random inputs but can choose, for example, the 90th percentile of similarity as a cutoff for incorrect input data.

Now when a program accesses a random Twitter page, a processor can check if it is within the variance of the random Twitter pages or not. If it is relatively close to the random access a processor can assign it as being incorrect access. Given sufficient incorrect access (e.g., more than 5 times) an algorithm running on a processor can conclude that the program is executing a DGA algorithm and mark attempts as suspicious.

Example 2

Figure 5:
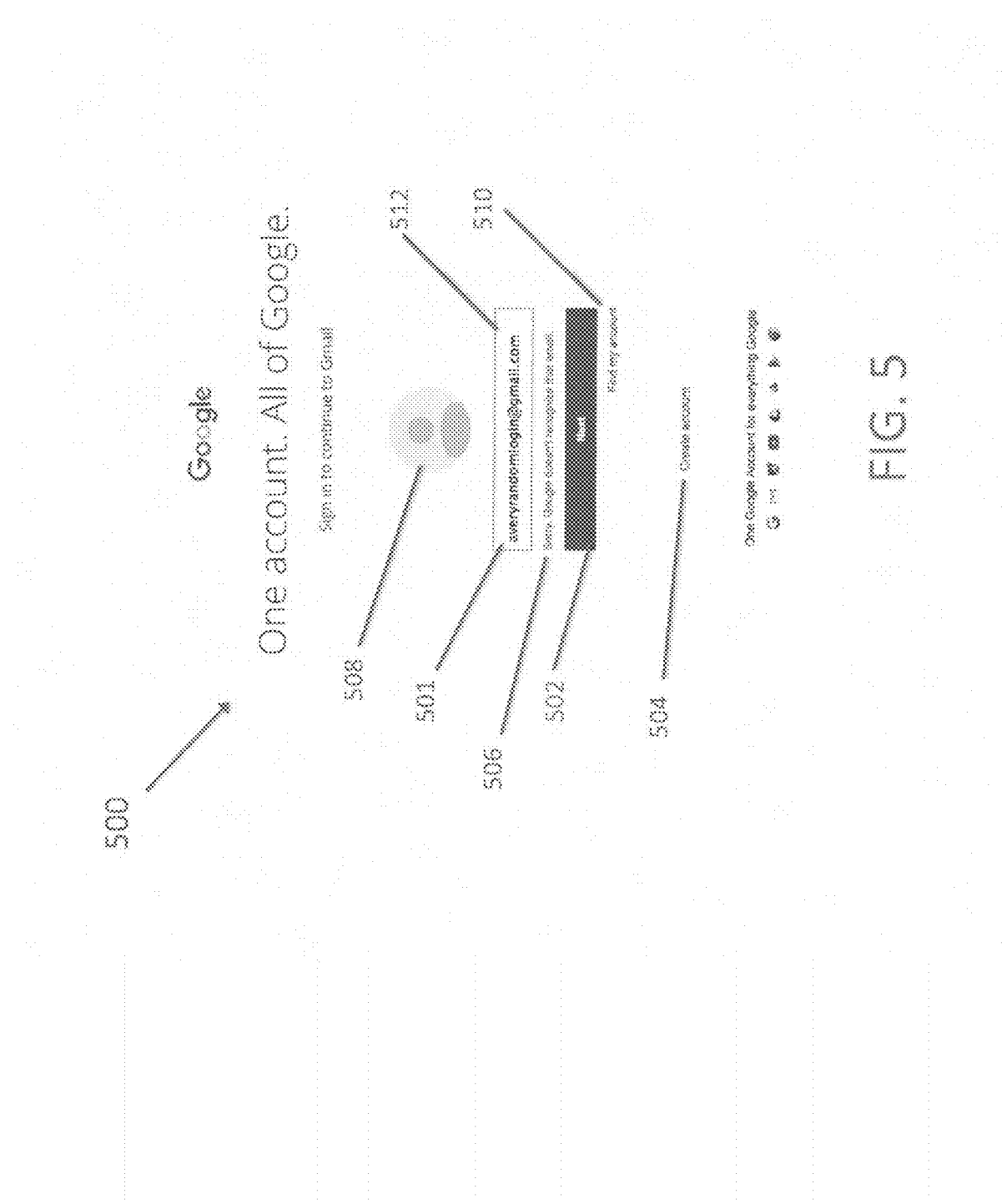
FIG. 5 illustrates the Gmail web service application after choosing a random nonexistent email to log into Gmail email.
Figure 6:
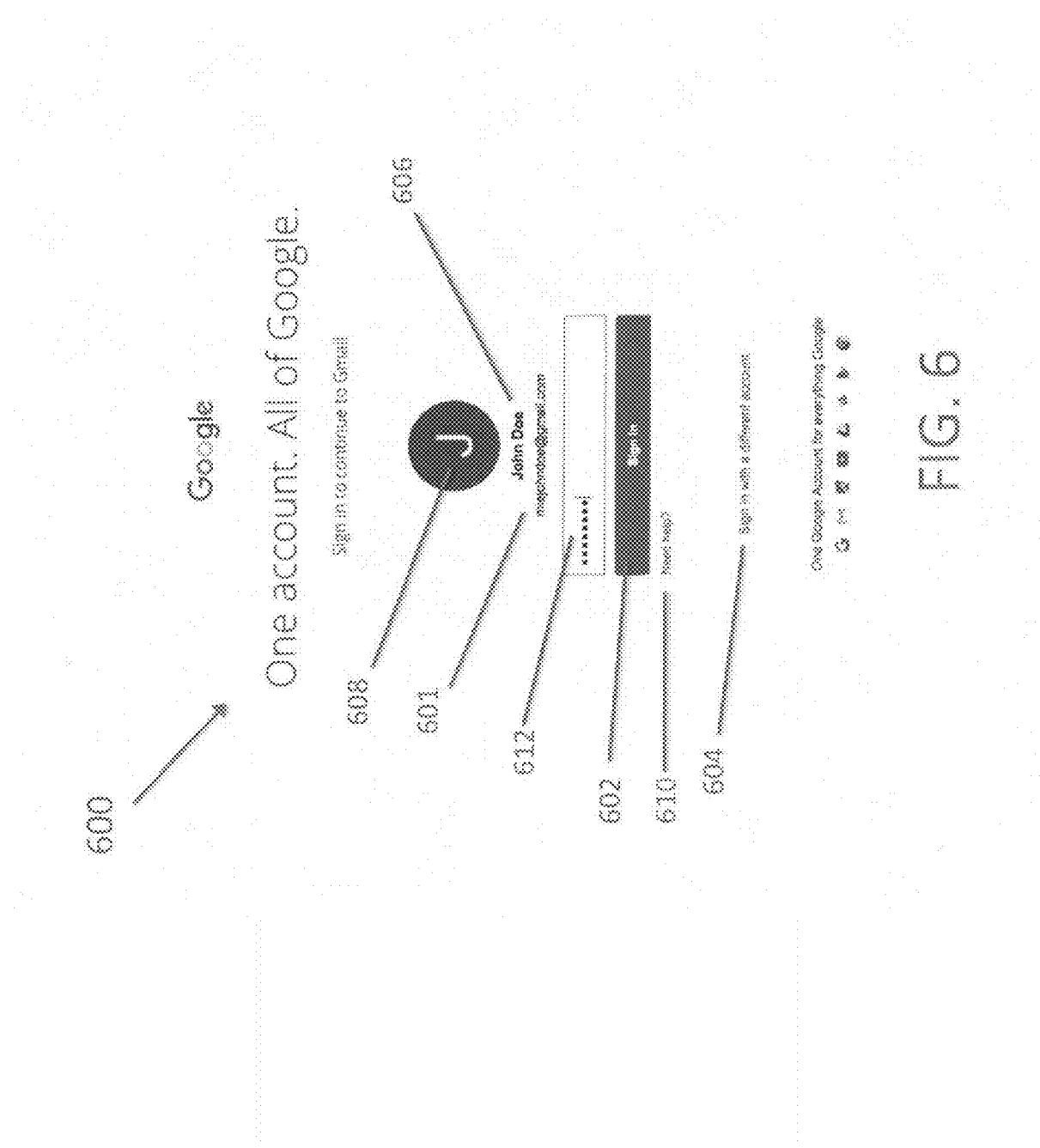
FIG. 6 illustrates the Gmail web service application after choosing a valid email to log into Gmail email.

FIG. 5 illustrates the Gmail web service application 500 after choosing a random nonexistent email 501 to log into Gmail email. FIG. 6 illustrates the Gmail web service application 600 after choosing a valid email 601 to log into Gmail email.

As can be seen in FIG. 6 a valid account 600 has different properties than an invalid account 500 (text saying "Sign in with a different account" 604 rather than text saying "Create account" 504, the appearance of the email which was attempted to be used 601 under the valid username 606, a sign in box 602 as opposed to a next box 502, a lack of the red text 506 saying that the email is incorrect, the appearance of a graphic with the first letter of the user's name 608 rather than a default person-outline 508, text saying "Need help?" 610 rather than "Find my account" 510, the appearance of a password box 612 rather than a red alert surrounding the invalid email 512, etc.).

The difference between invalid attempts (note that the only difference between one invalid Gmail email login attempt and another would be the random login that is used—in FIG. 5, item 501) is clearly much smaller than the difference between a valid attempt and the invalid attempt. This allows detection of invalid attempts. Aggregation across multiple programs is also possible. For example, if a given url appears in multiple programs, it can be assigned higher or lower suspiciousness. If multiple copies of the same program access the same erroneous website, the probability estimates can be modified. For example, if a large number of devices make the same subsequence of incorrect attempts this is suspicious. More generally, if there are k devices/programs, one denotes by $F_i$ the failed attempts by device i. The method first finds a subset of the k devices with a non-zero intersection of the $F_i$. If the intersection is large, one can indict some probability of a malware being present. If the order of (subsets) of the $F_i$ is retained the probability of a malware being present increases sharply.

Upon reaching a sufficient probability of a malware being present, a processor can disable the program, alert operators, block access to the internet, prevent large amounts of data being sent from the computer or take other actions.

Figure 7:
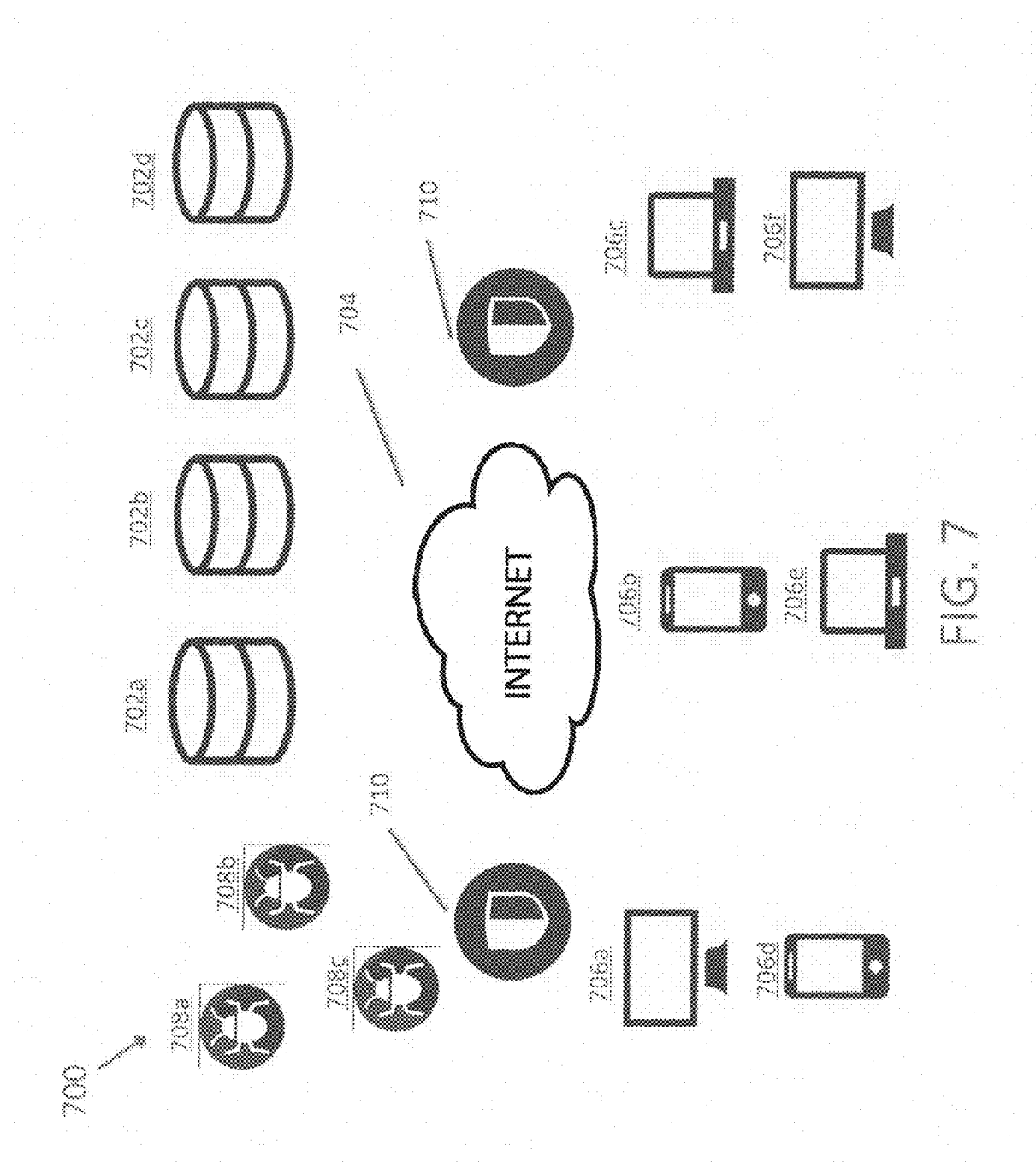
FIG. 7 is an architecture diagram illustrating a system for the prevention of RGA malware.

FIG. 7 is an architecture diagram illustrating a system 700 for the prevention of RGA malware. Internet services 702a-702d are connected to the internet 704. Clients 706a-706f, via the internet 704, access the various internet services 702-702d. To detect malware attempts 708a-708c, software 710 is installed on individual endpoints in a network of internet services, the software monitoring programs within the network and collecting information about where requests originated from. The software 710 implements the algorithm described in FIG. 1.

Figure 8:
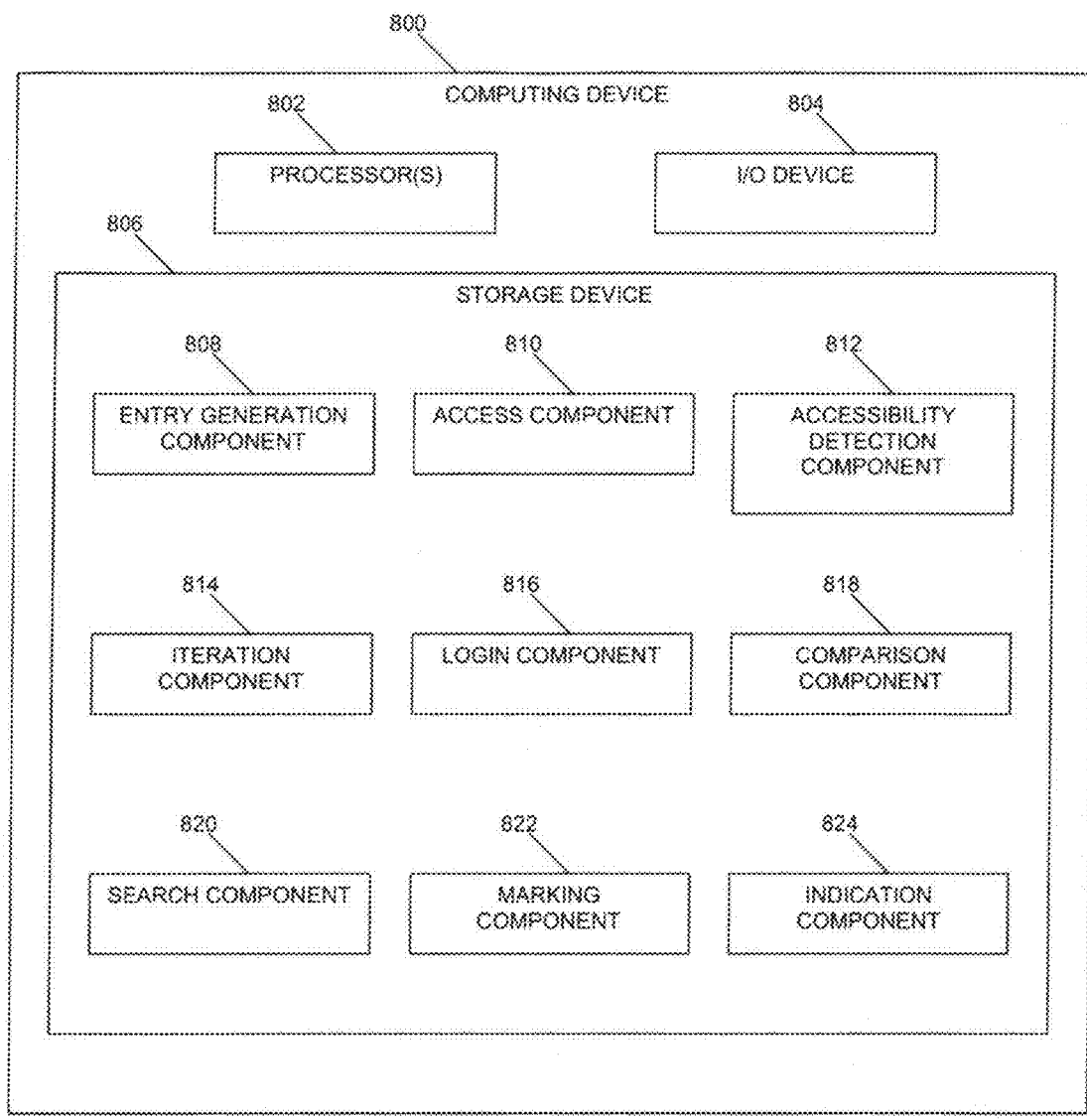
FIG. 8 is a block diagram of components in a computing device for prevention of RGA malware, in accordance with some exemplary embodiments of the disclosed subject matter.

FIG. 8 is a block diagram of components in a computing device for prevention of RGA malware, in accordance with some exemplary embodiments of the disclosed subject matter. The invention may be implemented as one or more computing devices such as computing device 800, which may comprise one or more processors 802. Any of processors 802 may be a Central Processing Unit (CPU), a microprocessor, an electronic circuit, an Integrated Circuit (IC) or the like. Alternatively, computing device 800 can be implemented as firmware written for or ported to a specific processor such as a digital signal processor (DSP) or microcontrollers, or can be implemented as hardware or configurable hardware such as a field programmable gate array (FPGA) or application specific integrated circuit (ASIC). Processors 802 may be utilized to perform computations required by computing device 800 or any of its subcomponents.

In some embodiments, computing device 800 may comprise or be in communication with one or more input-output (I/O) devices 804 such as a terminal, a display for displaying an image, speakers, a microphone or another audio I/O devices or the like, a keyboard, a touch screen, an I/O device used for recognizing a person or interacting with the system, or the like.

Computing device 800 may comprise one or more storage devices 806 for storing executable components. Storage device 806 may also contain data during execution of one or more components. Storage device 806 may be persistent or volatile. For example, storage device 806 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, storage device 806 may retain program code operative to cause any of processors 802 to perform acts associated with any of the steps shown in FIG. 1 above, for example choosing a random entry to the website/service, detecting the indication of non-accessibility, or the like.

The components detailed below may be implemented as one or more sets of interrelated computer instructions, executed for example by any of processors 802 or by another processor. The components may be arranged as one or more executable files, dynamic libraries, static libraries, methods, functions, services, or the like, programmed in any programming language and under any computing environment. Storage device 806 may comprise or be loaded with one or more of the components, which can be executed on computing platform 800 by any one or more of processors 802. Alternatively, any of the executable components may be executed on any other computing device which may be in direct or indirect communication with computing platform 800.

Storage device 806 may comprise an entry generation component 808 for generating a random entry to the internet service; an access component 810 for attempting to access the internet service with the random entry; an accessibility detection component 812 for detecting the indication of the internet service's non-accessibility for the random entry; an iteration component 814 for repeating steps performed by components 808 through 812; a login component 816 for logging into the internet service if there is a successful attempt; a comparison component 818 for comparing the results for the several attempts; a search component 820 for searching for the commonalities of the failed attempts; a marking component 822 for marking a new attempt as a failed attempt when the new attempt is within the variance of the known failed attempts; and an indication component 824 for providing an indication of a malware DGA attempt if enough failed attempts have accrued.

Any combination of one or more computer usable or computer readable medium(s) may be utilized. The computer-usable or computer-readable medium may be, for example but not limited to, any non-transitory computer-readable medium, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present disclosure may be written in any combination of one or more programming languages, including an object oriented programming language such as Java, Smalltalk, C++ or the like, conventional procedural programming languages, such as the "C" programming language or similar programming languages, scripting languages such as Perl, Python, Ruby, or any other programming language. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

While the above specification and examples provide a description of the invention, many embodiments of the invention can be made without departing from the spirit and scope of the invention. It is to be understood that the foregoing embodiments are provided as illustrative only, and do not limit or define the scope of the invention. Various other embodiments are also within the scope of the claims.

What is claimed is:

1. A method for the prevention of malware over an existing internet service, comprising:
    A) installing software on individual endpoints in a network, the software monitoring programs within the network and collecting information about where requests originated from, the software performing a method comprising:
    B) generating a random entry to an internet service;
    C) attempting to access the internet service with the random entry;
    D) detecting the indication of the internet service's non-accessibility for the random entry;
    E) repeating steps B) through D) one or more times;
    F) logging into the internet service if there is a successful attempt;
    G) comparing the results for the several attempts;
    H) searching for the commonalities of the failed attempts;
    I) marking a new attempt as a failed attempt when the new attempt is within the variance of the known failed attempts;
    J) providing an indication of a malware attempt if a predetermined number of failed attempts have accrued.

2. The method of claim 1, wherein the step of generating a random entry to the internet service further comprises the step of detecting differences between two existing access attempts to the internet service, taking the common part between the two requests as fixed and generating a noncommon part.

3. The method of claim 1, wherein the step of accessing the internet service with the random entry further comprises one or more from the list comprising: browsing to a webpage associated with the internet service, viewing a webpage associated with the internet service, searching for a internet service username, and emailing an account associated with the internet service to see if it exists.

4. The method of claim 1, wherein the step of detecting the indication of the internet service's non-accessibility further comprises the step of using a replay to take input and replay the input back using man in the middle.

5. The method of claim 1, wherein the step of comparing the results for the several attempts further comprises the step of finding the difference between the results using a desired distance function.

6. The method of claim 5, wherein the distance function is earth movers distance.

7. The method of claim 5, wherein the random entry used from each result is removed from the process of finding the distance.

8. The method of claim 1, wherein the commonalities comprise one or more from the list of: common elements which do not appear in successful attempts, and distances between the unsuccessful attempts.

9. The method of claim 1, wherein the accrual of failed attempts is temporal, logical, or statistical.

10. The method of claim 1, wherein the method first starts upon the occurrence of one or more from the following list: when an internet service is first accessed, when new domains are found, periodically or upon a statistical threshold being reached.

11. The method of claim 1, wherein the internet service is one or more from the following list: an email service, a tweet service, a phone service, an imaging service, and a videoconferencing service.

12. The method of claim 1, wherein the step of generating a random entry to the internet service further comprises the step of choosing the 90th percentile of similarity.

13. A computer program product stored in a computer readable medium for prevention of malware over an existing internet service comprising:
   a non-transitory computer readable medium;
   a first program instruction for generating a random entry to an internet service;
   a second program instruction for attempting to access the internet service with the random entry;
   a third program instruction for detecting the indication of the internet service's non-accessibility for the random entry;
   a fourth program instruction_ or iterating the first, second and third program instructions a predetermined number of times;
   a fifth program instruction for logging into the internet service if there is a successful attempt;
   a sixth program instruction for comparing the results for the several attempts;
   a seventh program instruction for searching for the commonalities of failed attempts;
   an eighth program instruction for marking a new attempt as a failed attempt when the new attempt is within the variance of the known failed attempts;
   a ninth program instruction for providing an indication of a malware attempt if a predetermined number of failed attempts have accrued;
   wherein said first, second, third, fourth, fifth, sixth, seventh, eighth, and ninth program instructions are stored on said non-transitory computer readable medium.

14. The computer program product of claim 13, wherein the action of generating a random entry to the internet service further comprises the action of detecting differences between two existing access attempts to the internet service, taking the common part between the two requests as fixed and generating a unique noncommon part.

15. The computer program product of claim 13, wherein the action of accessing the internet service with the random entry further comprises one or more from the list comprising: browsing to a webpage associated with the internet service, viewing a webpage associated with the internet service, searching for an internet service username, and emailing an account associated with the internet service to see if it exists.

16. The computer program product of claim 13, wherein the action of detecting the indication of the internet service's non-accessibility further comprises the action of using a replay to take input and replay the input back using man in the middle.

17. The computer program product of claim 13, wherein the action of comparing the results for the several attempts further comprises the action of finding the difference between the results using a desired distance function.

18. The computer program product of claim 17, wherein the distance function is earth movers distance.

19. The computer program product of claim 17, wherein the random entry used from each result is removed from the process of finding the distance.

20. The computer program product of claim 13, wherein the commonalities comprise one or more from the list of: common elements which do not appear in successful attempts, and distances between the unsuccessful attempts.

21. The computer program product of claim 13, wherein the accrual of failed attempts is temporal, logical, or statistical.

22. The computer program product of claim 13, wherein the set of instructions of the computer program product first starts upon the occurrence of one or more from the following list: when an internet service is first accessed, when new domains are found, periodically or upon a statistical threshold being reached.

23. The computer program product of claim 13, wherein the internet service is one or more from the following list: an email service, a tweet service, a phone service, an imaging service, and a videoconferencing service.

24. The computer program product of claim 13, wherein the action of generating a random entry to the internet service further comprises the step of choosing the 90th percentile of similarity.

25. A system for the prevention of malware over an existing internet service comprising:
   installed software on individual endpoints in a network, the software monitoring programs within the network and collecting information about where requests originated from, the software implementing a method comprising the steps of:
      A) generating a random entry to an internet service;
      B) attempting to access the internet service with the random entry;
      C) detecting the indication of the internet service's non-accessibility for the random entry;
      D) repeating steps A) through C) one ore more times;
      E) logging into the internet service if there is a successful attempt;
      F) comparing the results for the several attempts;
      G) searching for the commonalities of the failed attempts;
      H) marking a new attempt as a failed attempt when the new attempt is within the variance of the known failed attempts;
      I) providing an indication of a malware DGA attempt if a predetermined number of failed attempts have accrued.

26. An apparatus having a processing unit and a storage device, the apparatus comprising:
   an entry generation component for A) generating a random entry to an internet service;
   an access component for B) attempting to access the internet service with the random entry;
   an accessibility detection component for C) detecting the indication of the internet service's non-accessibility for the random entry;
   an iteration component for D) repeating steps A) through C) one ore more times;
   a login component for E) logging into the internet service if there is a successful attempt;
   a comparison component for F) comparing the results for the several attempts;
   a search component for G) searching for the commonalities of the failed attempts;
   a marking component for H) marking a new attempt as a failed attempt when the new attempt is within the variance of the known failed attempts;
   an indication component for I) providing an indication of a malware DGA attempt if a predetermined number of failed attempts have accrued.

* * * * *